(12) United States Patent
Goyal et al.

(10) Patent No.: US 11,336,605 B1
(45) Date of Patent: May 17, 2022

(54) SENDING ACTIONABLE NOTIFICATIONS TO USERS

(71) Applicant: ServiceNow, Inc., Santa Clara, CA (US)

(72) Inventors: Gaurav Goyal, San Jose, CA (US); Ashita Narayan, Hyderabad (IN); Kakarla V V D L Narayana, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/140,944

(22) Filed: Jan. 4, 2021

(51) Int. Cl.
  *H04L 51/224* (2022.01)
  *G06N 20/00* (2019.01)
  *H04L 51/02* (2022.01)
  *H04L 51/42* (2022.01)
  *H04L 51/18* (2022.01)

(52) U.S. Cl.
  CPC ............. *H04L 51/24* (2013.01); *G06N 20/00* (2019.01); *H04L 51/02* (2013.01); *H04L 51/18* (2013.01); *H04L 51/22* (2013.01)

(58) Field of Classification Search
  CPC ......... H04L 51/24; H04L 51/02; H04L 51/18; H04L 51/22; G06N 20/00
  See application file for complete search history.

(56) References Cited

U.S. PATENT DOCUMENTS

| | | | | |
|---|---|---|---|---|
| 10,419,219 B1* | 9/2019 | Wieker | ................ | H04L 9/0891 |
| 2002/0168965 A1* | 11/2002 | Gregory | ............. | H04M 1/7243 |
| | | | | 455/412.1 |
| 2008/0055070 A1* | 3/2008 | Bange | .................... | H04B 7/265 |
| | | | | 340/539.12 |
| 2010/0153501 A1* | 6/2010 | Gabriel | .................... | G06F 9/542 |
| | | | | 709/206 |
| 2014/0149572 A1* | 5/2014 | Menezes | ................ | H04L 43/12 |
| | | | | 709/224 |
| 2015/0082212 A1* | 3/2015 | Sharda | .................... | H04L 67/26 |
| | | | | 715/764 |
| 2015/0212675 A1* | 7/2015 | Firstenberg | ........... | G06F 3/0484 |
| | | | | 715/747 |
| 2019/0019077 A1* | 1/2019 | Griffin | .................... | G06N 5/041 |
| 2019/0171712 A1* | 6/2019 | Eisenzopf | ............... | G06F 40/35 |
| 2019/0190987 A1* | 6/2019 | Waffner | ............... | H04L 67/104 |
| 2019/0384794 A1* | 12/2019 | Holly, Jr. | ........... | G06F 16/90332 |
| 2020/0053199 A1* | 2/2020 | Kaplan | ............. | H04M 1/72451 |
| 2020/0117858 A1* | 4/2020 | Freeman | ................ | G06F 40/35 |
| 2020/0143288 A1* | 5/2020 | Eisenzopf | ............... | G06F 40/30 |
| 2020/0175964 A1* | 6/2020 | Eisenzopf | ............. | G06F 40/216 |
| 2020/0210880 A1* | 7/2020 | Kuo | ........................ | G06N 3/006 |
| 2020/0265339 A1* | 8/2020 | Eisenzopf | ............. | G06N 20/00 |
| 2020/0287851 A1* | 9/2020 | Anderson | ............... | H04L 51/16 |
| 2020/0311208 A1* | 10/2020 | Koohmarey | ........... | G06N 3/004 |
| 2020/0326684 A1* | 10/2020 | Chand | ............. | G05B 19/41875 |
| 2020/0349199 A1* | 11/2020 | Jayaraman | ............ | G06F 40/216 |
| 2020/0382450 A1* | 12/2020 | Vaughn | .................. | G06N 3/006 |

(Continued)

*Primary Examiner* — Sargon N Nano
(74) *Attorney, Agent, or Firm* — Van Pelt, Yi & James LLP

(57) ABSTRACT

An indication of an actionable notification to be sent to a user is received. A communication channel among a plurality of communication channel options for the user is selected based at least in part on a previous communication history with the user. The actionable notification is sent to the user via the selected communication channel at a time selected based on an activity status of the user.

20 Claims, 7 Drawing Sheets

(56) References Cited

U.S. PATENT DOCUMENTS

| | | | |
|---|---|---|---|
| 2021/0029065 A1* | 1/2021 | Erhart | G06F 40/30 |
| 2021/0029246 A1* | 1/2021 | Erhart | H04L 51/02 |
| 2021/0029249 A1* | 1/2021 | Erhart | H04L 51/02 |
| 2021/0157990 A1* | 5/2021 | Lima | G06F 40/58 |
| 2021/0201652 A1* | 7/2021 | Mon | H04N 7/181 |
| 2021/0203623 A1* | 7/2021 | Zhou | G06F 16/3329 |
| 2021/0234827 A1* | 7/2021 | Waldman | G06Q 10/1097 |
| 2021/0306388 A1* | 9/2021 | Phillips | H04L 67/141 |
| 2021/0367855 A1* | 11/2021 | Pampaiah | H04L 41/12 |
| 2021/0390144 A1* | 12/2021 | B M S | H04L 65/4053 |
| 2021/0397166 A1* | 12/2021 | Sayyarrodsari | G05B 19/41835 |
| 2021/0397171 A1* | 12/2021 | Sayyarrodsari | G05B 19/41885 |
| 2021/0407504 A1* | 12/2021 | Colleen | G06N 5/02 |
| 2022/0012604 A1* | 1/2022 | Mumma | G06Q 30/0185 |

* cited by examiner

SENDING ACTIONABLE NOTIFICATIONS TO USERS

BACKGROUND OF THE INVENTION

Communication channels are logical connections over a multiplexed medium that are used to convey information, e.g., a digital bit stream, from one or more senders to one or more receivers. Examples of communication channels include radio telecommunications channels and computer network channels. Oftentimes, notifications are sent to users over a specified communication channel. For example, text messages may be sent to a user's cell phone, emails may be sent to the user over the Internet, etc. User are often frustrated by a lack of interactivity associated with notifications they receive. Thus, it would be beneficial to develop techniques directed toward improving notifications to allow for improved user experiences.

BRIEF DESCRIPTION OF THE DRAWINGS

Various embodiments of the invention are disclosed in the following detailed description and the accompanying drawings.

DETAILED DESCRIPTION

Figure 1:
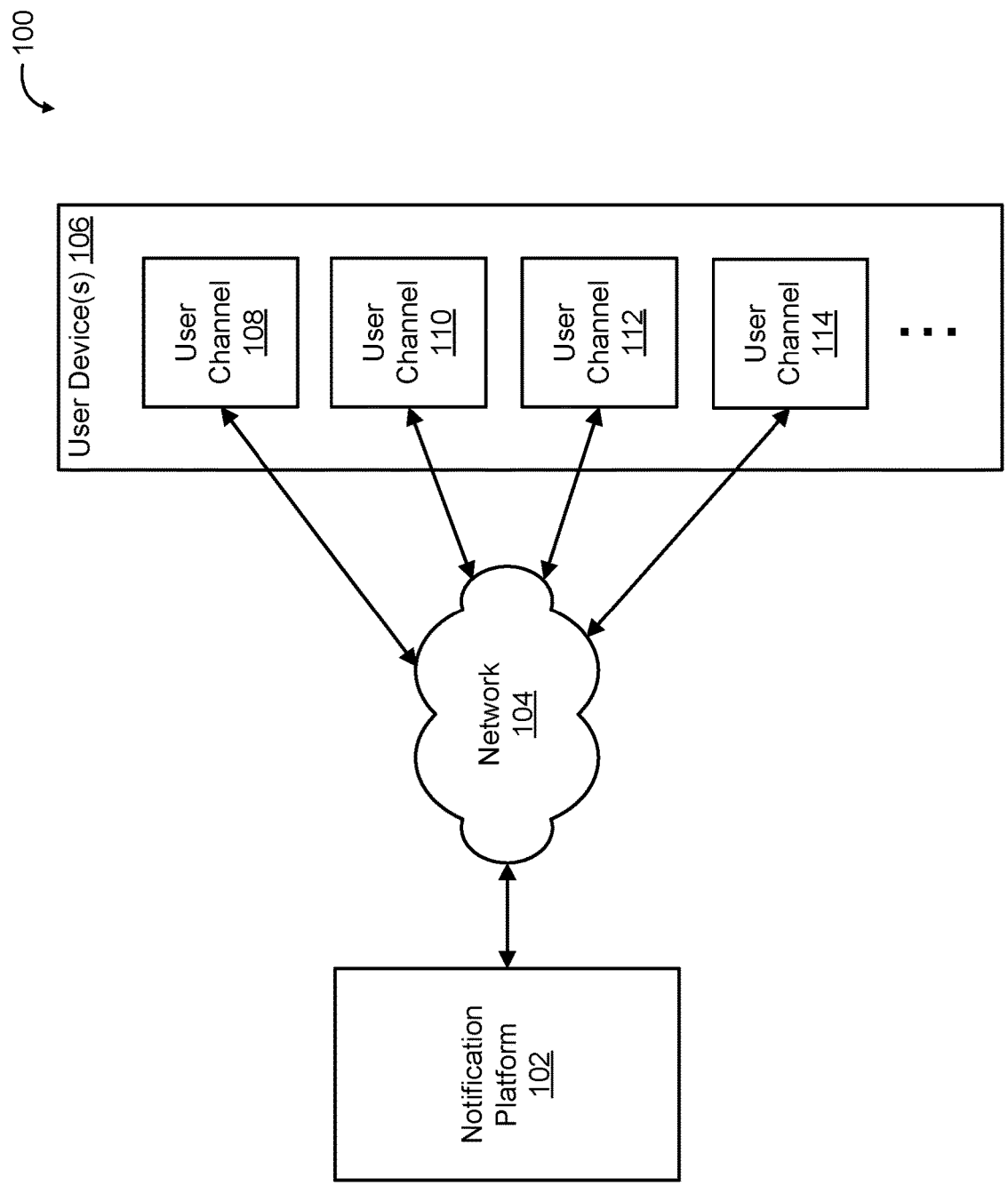
FIG. 1 is a block diagram illustrating an embodiment of system for sending notifications.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An indication of an actionable notification to be sent to a user is received. A communication channel among a plurality of communication channel options for the user is selected based at least in part on a previous communication history with the user. The actionable notification is sent to the user via the selected communication channel at a time selected based on an activity status of the user.

A practical and technological benefit of the techniques disclosed herein is more efficient interactions between a user and a system delivering notifications. Prior approaches are deficient because notifications sent to users lack complex, bi-directional communication functionality. The techniques disclosed herein provide for complex, bi-directional communication functionality, including allowing a user to take an action associated with a notification and select from multiple available notifications. The techniques disclosed herein provide for more complex interaction and communication between a user and a virtual agent of a notification platform. As used herein, a virtual agent refers to a software program that uses scripted rules and/or artificial intelligence to provide automated service or guidance to humans. An example of a virtual agent is a chatbot. The virtual agent is able to conduct a conversation, typically via text, with a human user. Virtual agents can be utilized for a variety of purposes, including customer service, technical assistance, and information gathering. In various embodiments, the virtual agent provides one or more notifications to a user, manages responses from the user, and interacts with the user regarding the one or more notifications. Technological advantages of the techniques disclosed herein include the ability to send notifications via multiple channels (and making them actionable), the ability for notifications to be delivered in a conversation setting whose context can be changed, the ability for additional communication channels to be added through a modular framework, the ability to hold (delay) notifications based on various factors, and the ability to select a communication channel based on various factors.

FIG. 1 is a block diagram illustrating an embodiment of system for sending notifications. In the example shown, system 100 includes notification platform 102, network 104, and user device(s) 106. In various embodiments, notification platform 102 includes one or more computers or other hardware components that provide notification functionality. In various embodiments, notification platform 102 includes various software components to complement its hardware components.

In the example illustrated, notification platform 102 is communicatively connected to user device(s) 106 via network 104. Notifications may be transmitted to and responses received from user device(s) 106 using network 104. Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, user device(s) 106 comprises one or more hardware components capable of receiving notifications and delivering them to a human (communication devices). Examples of hardware components comprising user device(s) 106 include a desktop computer, a laptop computer, a tablet, a smartphone, a smartwatch, or other devices.

In the example illustrated, multiple channels (user channels 108, 110, 112, and 114) are available for communication between notification platform 102 and a user using user device(s) 106. Stated alternatively, in the example illustrated, multiple communication channel options are available for sending a notification (e.g., an actionable notification) to a user of user device(s) 106. In various embodiments, the multiple user channels include one or more chat services. A chat service refers to any online service or technology that enables messages in text form to be exchanged in real time between participants. The chat service (also referred to as a messaging service, instant messenger, etc.) can be comprised of software installed on a device, e.g., a computer program installed on a computer, an app installed on a smartphone, etc. The chat service can be supported through various communication modalities. Stated alternatively, messages, such as notifications, can be sent via various modalities (e.g., Internet, mobile phone, other networks, etc.). In some embodiments, at least one of the multiple channels is an email (electronic mail) channel. In some embodiments, at least one of the multiple channels is a mobile phone text messaging channel. In some embodiments, at least one of the multiple channels is a phone voice channel (e.g., a notification may be sent to a user as voice data and a response in either voice data or non-voice data formats may be received by notification platform 102). The number of user channels shown is merely illustrative. It is possible for there to be more or fewer user channels.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. Components not shown in FIG. 1 may also exist.

Figure 2:
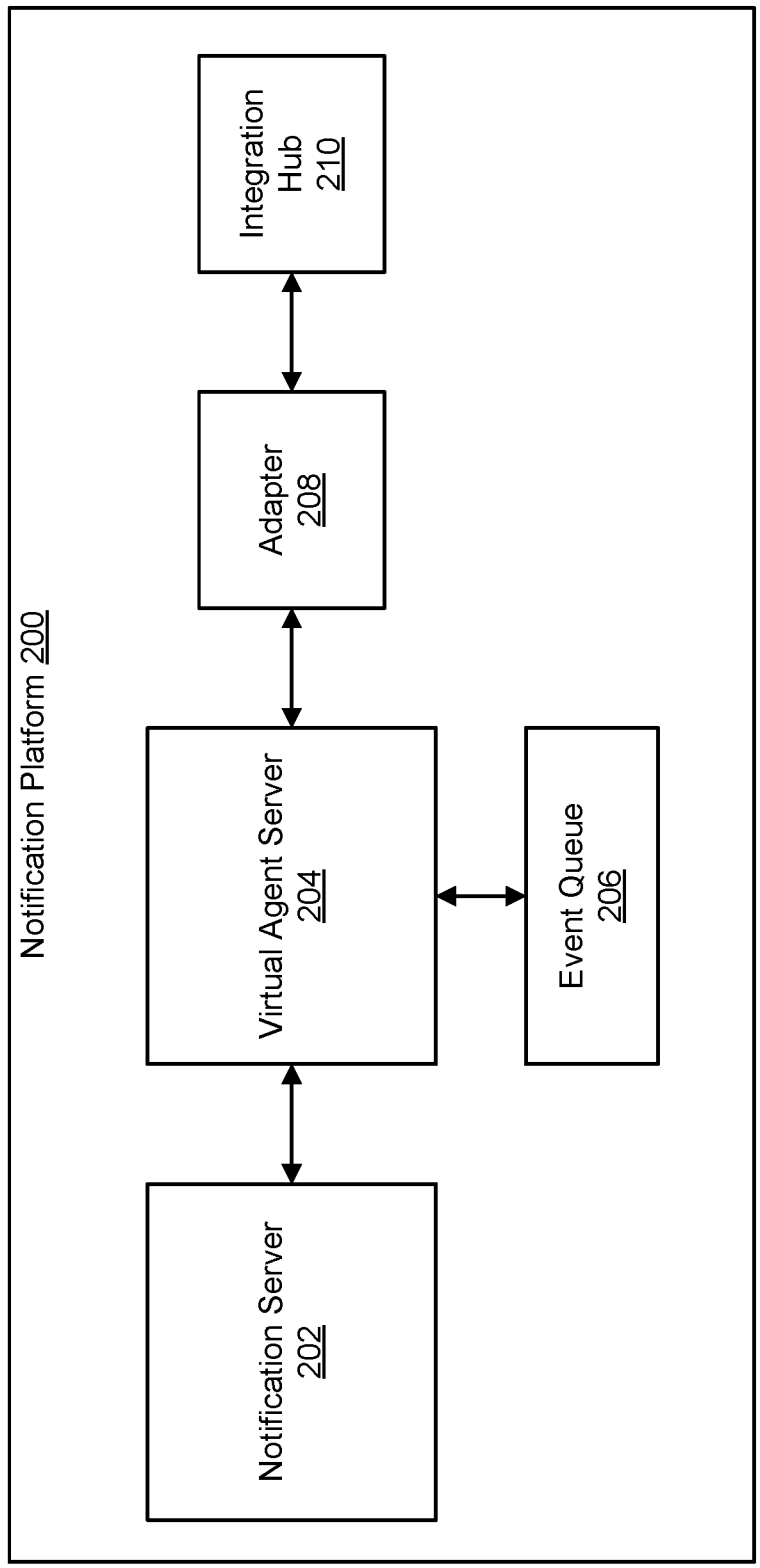
FIG. 2 is a block diagram illustrating an embodiment of a notification platform.

FIG. 2 is a block diagram illustrating an embodiment of a notification platform. In some embodiments, notification platform 200 is notification platform 102 of FIG. 1. In the example shown, notification platform 200 includes notification server 202, virtual agent server 204, event queue 206, adapter 208, and integration hub 210.

In various embodiments, notification server 202 sets up notifications to be sent to virtual agent server 204. In various embodiments, notification server 202 includes a computer or other hardware components and includes software components with notification processing functionality. Notifications can be triggered and set up by notification server 202 in various ways. For example, specified event or record (e.g., status) changes can trigger notifications. An example of an event triggering a notification is a reminder notification to take an action being triggered on a specified date or at a specified time. An example of a record (e.g., status) change triggering a notification is a notification in response to a user of a service failing to receive the service, such as in an information technology service management (ITSM) context, or a new product becoming available to a user, such as in a customer service management (CSM) context. ITSM refers to how an information technology team manages end-to-end delivery of information technology services, including processes and activities to design, create, deliver, and support information technology services. CSM refers to practices, strategies, and technologies used to manage and analyze customer interactions and data throughout a customer lifecycle with a goal of improving business relationships with customers, assisting in customer retention, and driving sales. It is also possible for a notification to be set up by a human agent (also referred to as a live agent) responsible for managing user needs and interacting with users. A user to which the notification is to be sent does not need to initiate a conversation (e.g., with a virtual agent) to trigger the notification. Notification server 202 sends notifications to virtual agent server 204 to handle. In some embodiments, sending a notification to virtual agent server 204 includes loading a destination (which can include determining a destination type for a particular user, such as a last used device and/or channel), initiating sending of the notification, sending the notification (which can include collecting a user identification), and closing sending of the notification (which can include collecting content to send and performing scheduling, e.g., determining a batch in which to place the notification). In various embodiments, notifications are sent to virtual agent server 204 in batches. Sending in batches conserves overhead resources associated with sending notifications to virtual agent server 204.

In various embodiments, virtual agent server 204 receives notifications from notification server 202. In various embodiments, virtual agent server 204 includes a computer or other hardware components and includes software components with virtual agent functionality. In some embodiments, a receive notification API (application programming interface) receives notifications. In some embodiments, the receive notification API sends received notifications to an event queue where notification batches are formed. In the example illustrated, virtual agent server 204 is communicatively connected to event queue 206, which stores batches of notifications. Event queue 206 can include temporary storage to store the batches of notifications. In various embodiments, notifications are received back from event queue 206 by virtual agent server 204, e.g., by a notification processor component. The notification processor component performs various checks and processing associated with each notification to ultimately transmit to a user.

In various embodiments, virtual agent server 204 (e.g., using the notification processor component) selects a topic for each notification in order to assign the notification to an appropriate virtual agent. In various embodiments, there are a variety of different virtual agents, each with a specialized function. For example, a first type of virtual agent may be an information technology virtual agent (to help with information technology issues), a second type of virtual agent may be a finance virtual agent (to help with finance matters), a third type of virtual agent may be a reservation virtual agent (e.g., to book hotel or restaurant reservations), a fourth type of virtual agent may be a survey virtual agent (e.g., to conduct surveys), and so forth. In various embodiments, a virtual agent that is appropriate for a specified notification topic is selected so that the virtual agent can communicate with a user about the notification and matters related to the topic of the notification.

A virtual agent can be selected in various ways. Rule-based keyword matching can be utilized. For example, if the word "survey" appears in a notification, a rule may dictate that a survey virtual agent should be assigned to the notification. Rule-based keyword matching may use operators such as "includes", "contains", "starts with", "not", "or", "and", "ends with", etc. A natural language understanding (NLU) approach can also be utilized. NLU may be utilized to determine an intent of an utterance, wherein the utterance comprises text of the notification to assign. The determined intent can be utilized to select an appropriate virtual agent. For example, if the determined intent is to book a restaurant reservation, a restaurant booking virtual agent could be selected. In various embodiments, NLU utilizes a machine learning model to determine what an utterance means. Stated alternatively, in various embodiments, a machine learning model is utilized to map utterances to intent. As used herein, an utterance refers to a natural language example of a user intent, e.g., a text string from a notification and an intent refers to something that should happen for a user or a system should do or a meaning. Examples of machine learning models that can be utilized to perform NLU tasks include word vector representations, window-based neural networks, recurrent neural networks, long-short-term-memory models, recursive neural networks, and convolutional neural networks. Prior to utilizing the machine learning model, the machine learning model is trained on a collection of utterance examples and their associated intents. This training occurs before a new utterance (each new notification) is processed using the machine learning model in inference mode.

In some embodiments, the notification processor component or another software component of virtual agent server 204 determines a communication channel for each notification. Oftentimes, there are multiple communication channel options for sending a notification to a particular user and it must be determined which communication channel to invoke. In various embodiments, virtual agent server 204 determines which channels are available for each user. In an ITSM context, communication channel information for each user is likely abundant because the users are typically members/employees of an organization that is sending notifications and the users have likely reported communication channel information (e.g., deposited the information in a database that virtual agent server 204 can access). In a CSM context, there is more likely to be incomplete information about which communication channels users have used because the users do not belong to the organization sending notifications (e.g., are third-party consumer end users). In some embodiments, the communication channel invoked to send a notification to a user is the last used communication channel by the user. It is also possible to send the notification via multiple communication channels if the user has used (e.g., logged into) multiple communication channels in the past. In scenarios in which the user has no past communication channel use history, a communication channel specified by the user as a default communication channel (e.g., text message) may be used.

In various embodiments, virtual agent server 204 determines whether a notification is actionable (e.g., whether a user receiving the notification can respond to the notification) or whether the notification is a broadcast notification. In various embodiments, virtual agent server 204 (e.g., via a notification controller software component) determines whether the user is in conversation. If it is determined that the user is in an active conversation, virtual agent server 204 may delay sending the notification to the user. If it is determined that the user is not in an active conversation, in various embodiments, virtual agent server 204 determines a notification topic and allows a virtual agent to present one or more notifications to the user. In various embodiments, virtual agents that communicate with users are stored on (hosted by) virtual agent server 204.

In the example illustrated, adapter 208 is communicatively connected to virtual agent server 204. In various embodiments, adapter 208 comprises computer code configured to, if necessary, transform communication messages into specified formats. For example, a notification that is to be sent to a user may be in a format supported by notification platform 200 but not in a format supported by a communication channel the user is currently using. In this scenario, adapter 208 performs an outbound transformation of the notification (e.g., using a script) into the format supported by the communication channel the user is currently using. Adapter 208 also performs inbound transformations of responses from the user back to a virtual agent of virtual agent server 204. For actionable notifications, communication between notification platform 200 and users is bi-directional. Thus, virtual agent server 204 both sends and receives messages (e.g., in a conversation between a virtual agent stored on virtual agent server 204 and a user). In the example shown, integration hub 210 is communicatively connected to adapter 208. In various embodiments, integration hub 210 is a software and/or hardware interface that handles communication of notifications and responses to notifications. In various embodiments, integration hub 210 aggregates notifications into a low-latency and shared data store to allow for large-scale and high-throughput communication to prevent notification platform 200 from getting overwhelmed by excessive workloads.

In the example shown, portions of the communication path between the components are shown. Other communication paths may exist, and the example of FIG. 2 has been simplified to illustrate the example clearly. Although single instances of components have been shown to simplify the diagram, additional instances of any of the components shown in FIG. 2 may exist. The number of components and the connections shown in FIG. 2 are merely illustrative. Components not shown in FIG. 2 may also exist.

Figure 3:
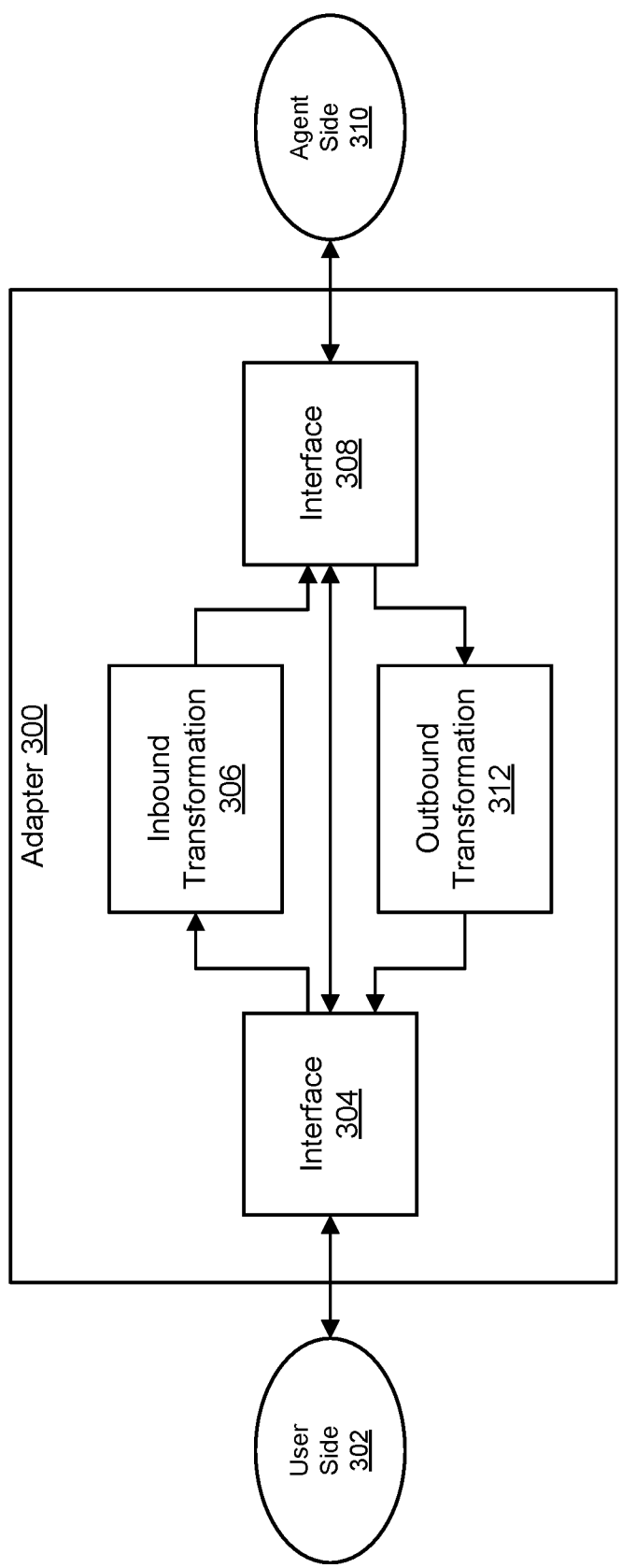
FIG. 3 is a block diagram illustrating an embodiment of a communication adapter.

FIG. 3 is a block diagram illustrating an embodiment of a communication adapter. In some embodiments, adapter 300 is adapter 208 of FIG. 2. In the example shown, adapter 300 mediates communication between a user and an agent (e.g., a virtual agent). The communication is bi-directional between the user and the agent. Communication in the direction of user to agent is referred to as inbound. Communication in the direction of agent to user is referred to as outbound.

In the example illustrated, an inbound communication travels from user side 302 through interface 304 and interface 308 to agent side 310. In scenarios in which a transformation of the inbound communication is required, the inbound communication also passes through inbound transformation 306. In various embodiments, user side 302 is associated with an end user (e.g., an employee of an organization, a customer that is receiving information about a consumer product, etc.). The inbound communication can be a response to an outbound communication, e.g., a response to an actionable notification sent from agent side 310 or a response to another type of message received by the end user. In some embodiments, interface 304 is a communication endpoint, such as a REpresentational State Transfer (REST) endpoint. In scenarios in which the inbound communication is in a format that is known to agent side 310, the inbound communication is passed directly to interface 308. For example, the inbound communication may be in a format that is natively supported by a platform associated with agent side 310. This can be a format for a specific communication channel (e.g., text messaging, a specific type of chat application, etc.) that is already supported by the platform. Stated alternatively, for some formats, no transformation is required.

In scenarios in which the inbound communication is in a format that is not known to agent side 310, the inbound communication is passed through inbound transformation 306 before reaching interface 308. For example, the inbound communication may be in a format for a communication channel that a user of a platform associated with agent side 310 has brought to the platform as a plug and play communication channel (e.g., a specific type of chat application that is not natively supported by the platform). In some embodiments, inbound transformation 306 comprises computer script code that is supplied by the user of the platform. In various embodiments, inbound transformation 306 converts a message from user side 302 into a format compatible with agent side 310. In some embodiments, interface 308 is an application programming interface that allows for interaction with a virtual agent. In various embodiments, interface 308 adapts a user conversational channel (e.g., based on a web portal, custom mobile app, text messaging, etc.) to allow for interaction with a virtual agent on agent side 310.

In the example illustrated, an outbound communication travels from agent side 310 through interface 308 and interface 304 to user side 302. In scenarios in which a transformation of the outbound communication is required, the outbound communication also passes through outbound transformation 312. In various embodiments, agent side 310 is associated with a virtual agent server (e.g., virtual agent server 204 of FIG. 2) that communicates with end users (e.g., by sending actionable notifications and following up with virtual agent conversations). The outbound communication can be an actionable notification. The outbound communication can also be a response to a user response to the actionable notification. In scenarios in which the outbound communication is in a format that is known to user side 302, the outbound communication is passed directly to interface 304. For example, the outbound communication may have already been converted to a user readable format because the format is natively supported by a platform associated with agent side 310. This can be a format for a specific communication channel (e.g., text messaging, a specific type of chat application, etc.) that is already supported by the platform. In scenarios in which the outbound communication is in a format that is not readable by user side 302, the outbound communication is passed through outbound transformation 312 before reaching interface 304. For example, the outbound communication may need to be converted to a specific format that a user of a platform associated with agent side 310 has brought to the platform as a plug and play communication channel (e.g., a specific type of chat application that is not natively supported by the platform). In some embodiments, outbound transformation 312 comprises computer script code that is supplied by the user of the platform.

In the example shown, portions of the communication path between the components are shown. Other communication paths may exist, and the example of FIG. 3 has been simplified to illustrate the example clearly. Although single instances of components have been shown to simplify the diagram, additional instances of any of the components shown in FIG. 3 may exist. The number of components and the connections shown in FIG. 3 are merely illustrative. Components not shown in FIG. 3 may also exist.

Figure 4:
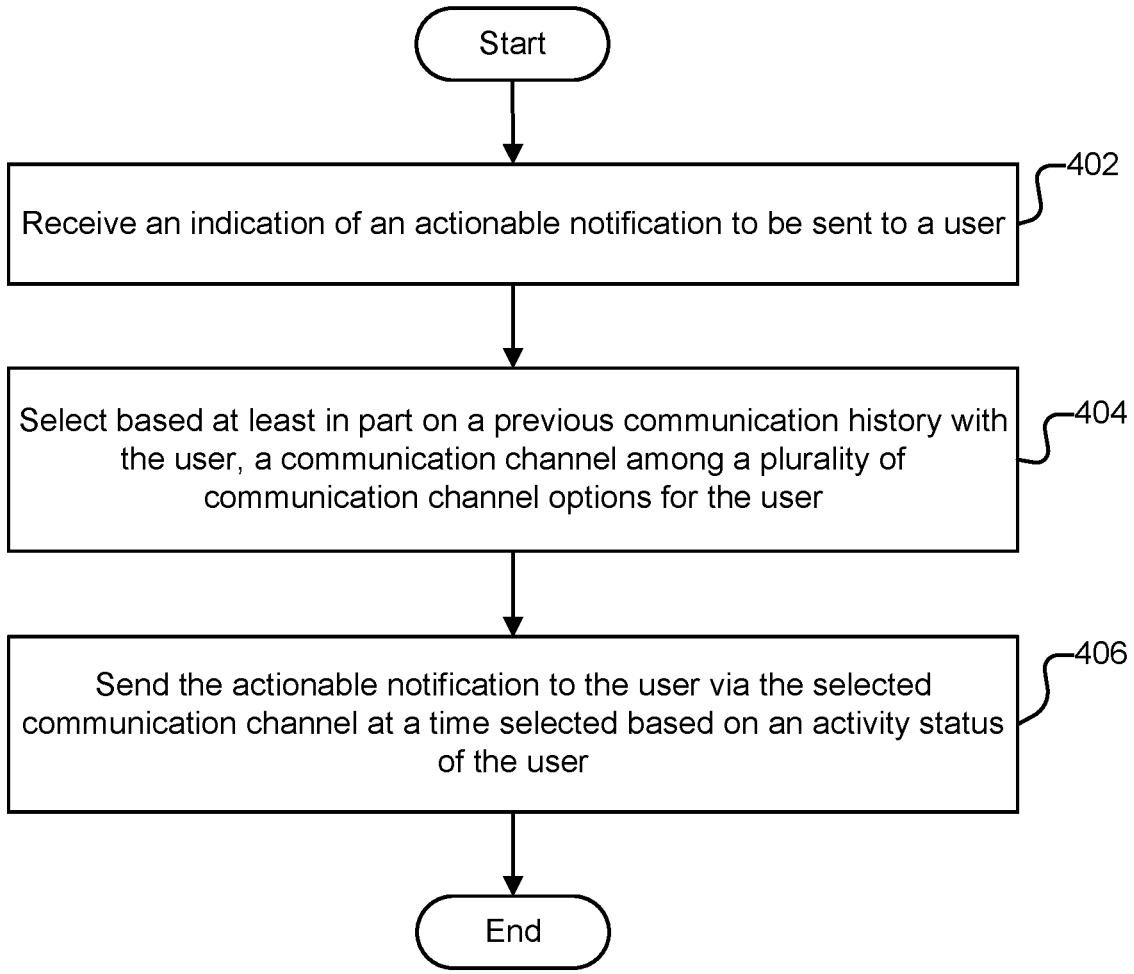
FIG. 4 is a flow chart illustrating an embodiment of a process for sending actionable notifications.

FIG. 4 is a flow chart illustrating an embodiment of a process for sending actionable notifications. In some embodiments, the process of FIG. 4 is performed by virtual agent server 204 of FIG. 2.

At 402, an indication of an actionable notification to be sent to a user is received. In some embodiments, the indication is received from notification server 202 of FIG. 2. Notifications can be triggered and set up by a notification server in response to specified event or record (e.g., status) changes. For example, a notification asking a user if he or she would like to take an employee survey may be triggered on a specified date corresponding to a new employment year (e.g., a timed event notification trigger). As another example, a notification asking a user if he or she wants to request information technology support may be triggered in response to an equipment (e.g., laptop) status indicating support is needed (e.g., not functional or not connected to a network). As another example, a notification asking a user if he or she wants to learn more about a new version of a consumer product may be triggered in response to an upgraded version of the consumer product being released. In various embodiments, an actionable notification refers to a notification that the user can act on and/or respond to. For example, the user can click on text of the actionable notification to receive additional information (e.g., see FIG. 6). In some embodiments, the user is an employee or member of an organization that operates a notification system that sends out actionable notifications to its employees/members. In some embodiments, the user is a third party (e.g., a third-party consumer) with respect to the sender (e.g., a business organization) of the actionable notification.

At 404, a communication channel is selected from among a plurality of communication channel options for the user based at least in part on a previous communication history with the user. Examples of communication channel options include multiple chat and/or messaging software applications and/or mobile apps, smartphone text messaging, other online services or technologies that allow for messages in text form to be exchanged in real time between participants, email, mobile voice, social media apps, and other electronic modalities for communicating with the user. In some embodiments, selecting the communication channel based on the previous communication history corresponds to selecting a last used communication channel for the user. For example, if the user last used a specific chat/messaging mobile app, that specific chat/messaging mobile app would be selected as the communication channel. It is also possible to select multiple communication channels. For example, the two communication channels the user last used could be selected or multiple communication channels the user has logged onto in the past could be selected. In scenarios in which there is no previous communication history with the user, a default communication channel may be selected (e.g., mobile text messaging). The default communication channel can be specified by the user (e.g., in a communication preferences profile established by the user). The communication preferences profile can also specify communication channels that the user desires to opt out of.

At 406, the actionable notification is sent to the user via the selected communication channel at a time selected based on an activity status of the user. In some embodiments, the activity status is associated with whether the user is in a conversation. For example, if the selected communication channel is a chat/messaging mobile app, the user is in conversation if the user is typing messages to another user of the chat/messaging mobile app or typing messages to a virtual agent (e.g., a virtual agent associated with a different notification). In some embodiments, selecting the time to send the actionable notification includes waiting until the user is no longer in a conversation or in a non-urgent conversation before sending the actionable notification. In some embodiments, a conversation is determined to be non-urgent if it is with a virtual agent instead of a live agent.

Figure 5:
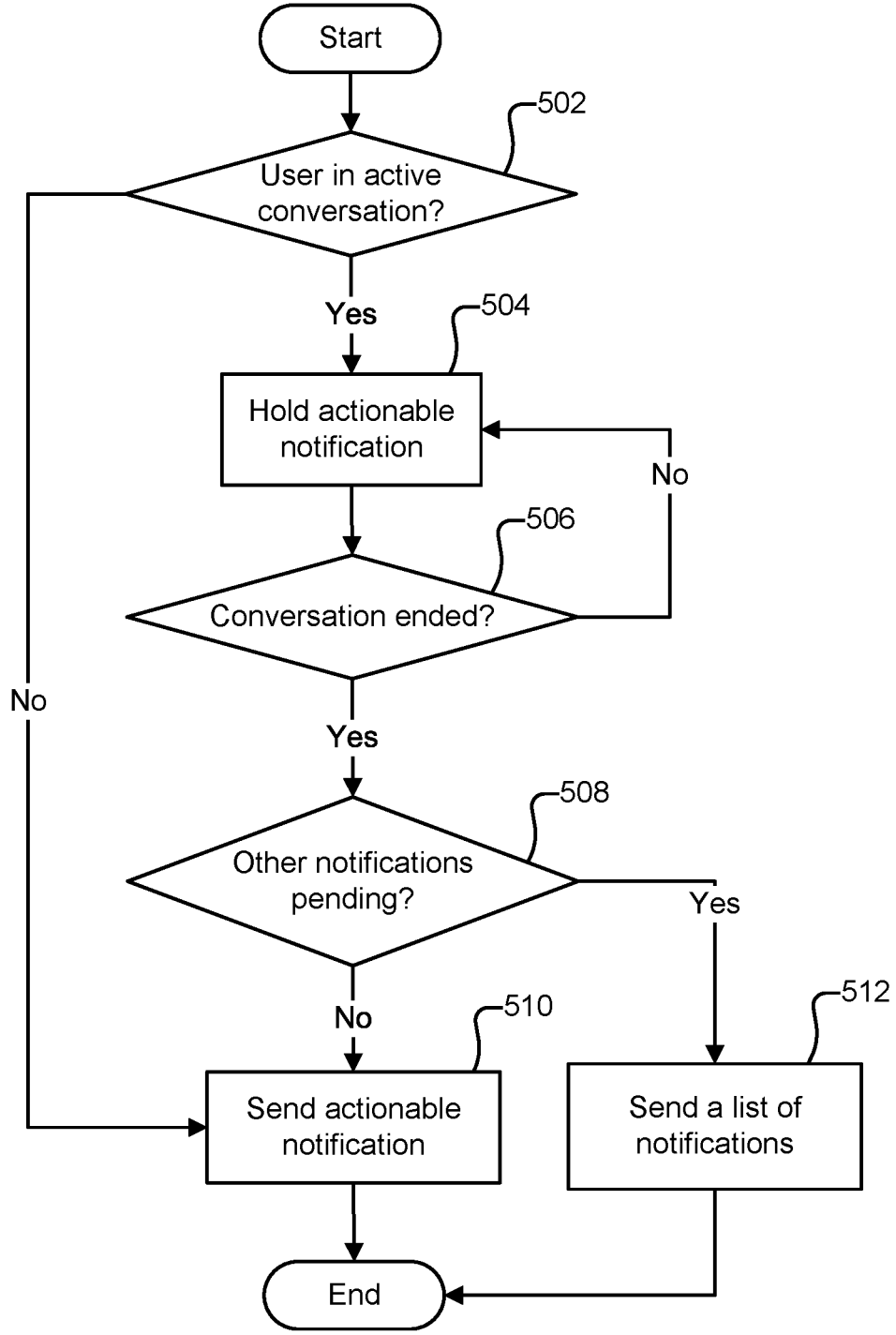
FIG. 5 is a flow chart illustrating an embodiment of a process for selecting a time to send an actionable notification.

FIG. 5 is a flow chart illustrating an embodiment of a process for selecting a time to send an actionable notification. In some embodiments, the process of FIG. 5 is performed by virtual agent server 204 of FIG. 2. In some embodiments, at least a portion of the process of FIG. 5 is performed in 406 of FIG. 4.

At 502, it is determined whether a user is in active conversation. In some embodiments, active conversation corresponds to the user currently using a selected communication channel. For example, using the selected communication channel can correspond to actively messaging another user. In some embodiments, the user is considered to be in active conversation if the user has typed or received a message within a specified amount of time (e.g., the last 10 seconds, the last 30 seconds, the last minute, etc.). In some embodiments, the user is considered to not be in active conversation if there has been no messaging activity for a specified amount of time (e.g., 10 seconds, 30 seconds, 1 minute, etc.).

If it is determined at 502 that the user is in active conversation, at 504, the actionable notification is held. Stated alternatively, in the example illustrated, if the user is in active conversation, sending of the actionable notification is delayed. If it is determined at 502 that the user is not in active conversation, at 510, the actionable notification is sent to the user.

At 506, it is determined whether a conversation that the user is in has ended. In some embodiments, the conversation is determined to have ended if the conversation is no longer active. For example, the conversation can be considered to have ended if there has been no messaging activity (e.g., messages sent by the user or messages received by the user) within a specified amount of time (e.g., 10 seconds, 30 seconds, 1 minute, etc.). The conversation can also be determined to have ended if the user has closed a messaging window with a messaging partner of the user.

If it is determined at 506 that the conversation has not ended, at 504, the actionable notification will continue to be held. If it is determined at 506 that the conversation has ended, at 508, it is determined whether other notifications to the user are pending. Other notifications may be pending because while the user has been in conversation other notifications (including actionable notifications) could have been held so as not to disturb the user while the user was in conversation. In various embodiments, pending notifications are held in a queue until they can be delivered to the user.

If it is determined at 508 that no other notifications are pending, at 510, the actionable notification is sent to be displayed to the user. In some embodiments, the actionable notification is sent through an adapter (e.g., adapter 208 of FIG. 2) to ensure that the actionable notification is sent in a format compatible with the selected communication channel that the user is using. In some embodiments, actionable notifications leave a notification platform (e.g., notification platform 200 of FIG. 2) to the user through an integration hub (e.g., integration hub 210 of FIG. 2). In various embodiments, the actionable notification is displayed on a device (e.g., smartphone, computer, tablet, etc.) of the user and the user can respond to the actionable notification. If it is determined at 508 that other notifications are pending, at 512, a list of notifications are sent to be displayed to the user.

The list of notifications can include actionable notifications as well as non-actionable notifications. In some embodiments, a drop-down list of notifications is presented to the user and the user is asked to select a notification from the list of notifications to view first (e.g., see FIG. 6).

In some embodiments, an urgency flag mechanism is utilized. The urgency flag acts to indicate that a conversation the user is in should be interrupted to deliver an urgent notification. In some embodiments, the urgency flag is evaluated if at 502 it is determined that the user is in active conversation. In this scenario, when the urgency flag is not active (indicating a corresponding actionable notification is not urgent), in various embodiments, the actionable notification is held (not sent to the user immediately). On the other hand, if at this point the urgency flag is active (indicating the corresponding actionable notification is urgent), the user can be asked whether the user would like to deal with the actionable notification. The actionable notification would be displayed if the user answers in the affirmative and held if the user answers in the negative. In some embodiments, the urgency flag mechanism is only utilized if the user is in active conversation with a virtual agent. Stated alternatively, in some embodiments, the user is not interrupted if the user is in a conversation with a human, but could be interrupted if the conversation is with a virtual agent.

Figure 6:
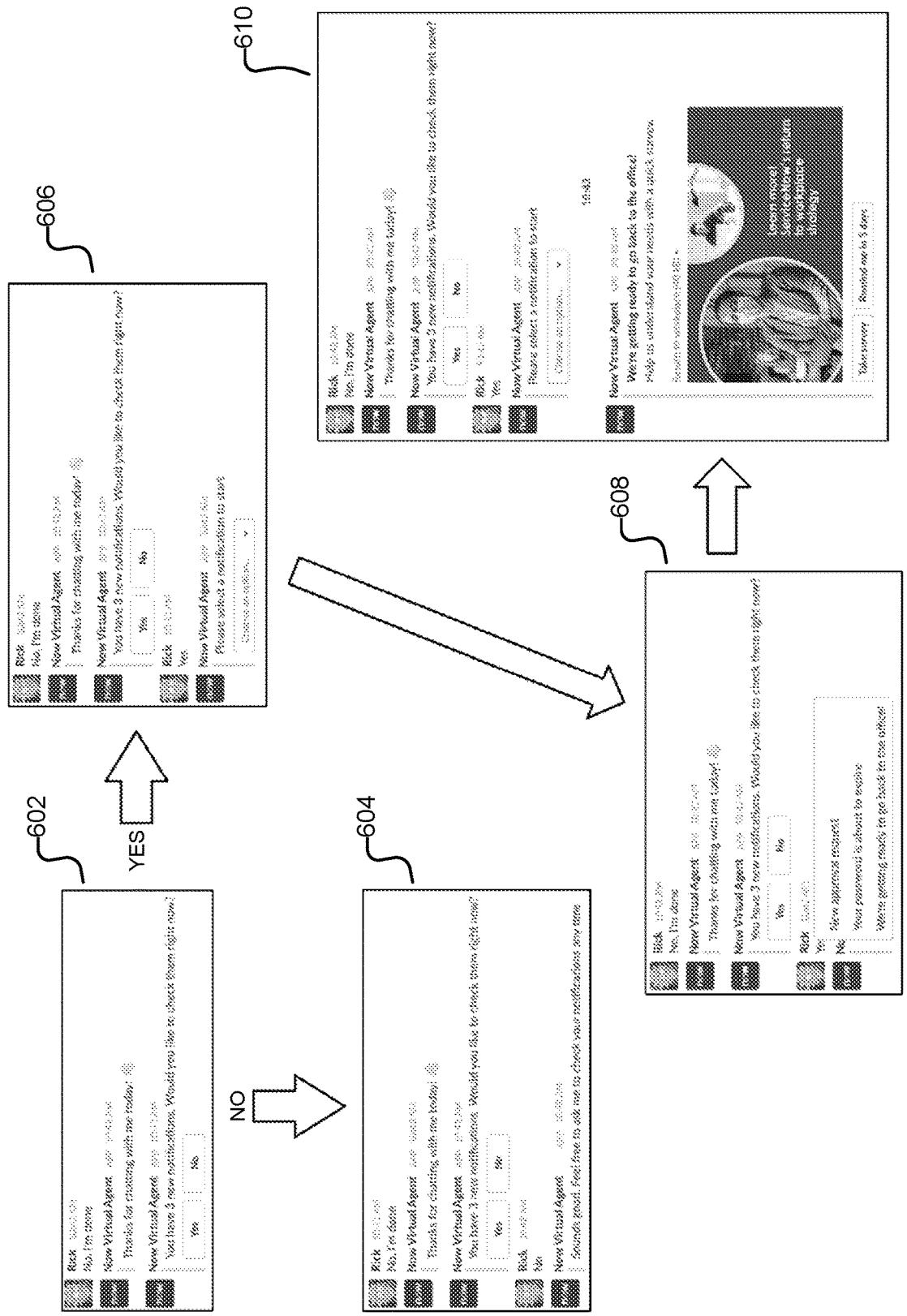
FIG. 6 is a diagram illustrating an example interaction involving actionable notifications between a user and a virtual agent.

FIG. 6 is a diagram illustrating an example interaction involving actionable notifications between a user and a virtual agent. In some embodiments, the virtual agent is hosted by virtual agent server 204 of FIG. 2.

In the example shown, at dialogue point 602, the virtual agent ("Now Virtual Agent") indicates to the user ("Rick") that there are three new notifications for the user and asks the user if the user would like to check them at this point. In some embodiments, dialogue point 602 corresponds to 512 of FIG. 5 in which there are multiple pending notifications for the user. In the example illustrated, in a scenario in which the user declines to review the new notifications, the virtual agent indicates to the user that the user can check the notifications at a later time by asking the virtual agent, as shown at dialogue point 604. In various embodiments, the user is able to engage in a natural language conversation with the virtual agent and make requests to the virtual agent through types messages. In a scenario in which the user agrees to review the new notifications, the virtual agent asks the user to select a notification to view, as shown at dialogue point 606. In the example illustrated, the user is able to select a notification through a drop-down list. In various embodiments, the user clicks an icon to display notifications to view.

In the example illustrated, at dialogue point 608, the three new notifications are shown to the user after the user has opened the list of notifications by clicking on the drop-down list. In the example illustrated, the notifications are ITSM/human resources notifications. The example shown is merely illustrative and not restrictive. Notifications in many other contexts, e.g., a CSM context, are also possible. In the example illustrated, the first notification is a "New approval request". This is an example of an event (an approval request being made) triggering a notification (to a user that is able to grant approval for the approval request). The second notification is "Your password is about to expire". This is an example of a timed event (a specified time before password expiration) triggering a notification. The third notification is "We're getting ready to go back to the office!" This could be a notification triggered in response to an office status record being updated to reflect a return to the office. It could also be a notification triggered in response to a timed event if going back to the office has been set for a specified date.

In the example illustrated, at dialogue point 610, the user has selected the third notification ("We're getting ready to go back to the office!"). This notification is an actionable notification because the user is able to respond to the notification, as demonstrated by the user being able to click on the notification in order to receive additional information associated with the notification. In the example shown, after the user selects this actionable notification, additional information is presented in the form of an invitation to take a returning to the workplace survey. Thus, there is a user interface component that the user is able to trigger to generate a display of information associated with the actionable notification. The user is presented with an option to take the survey immediately or to take the survey at a later time.

Figure 7:
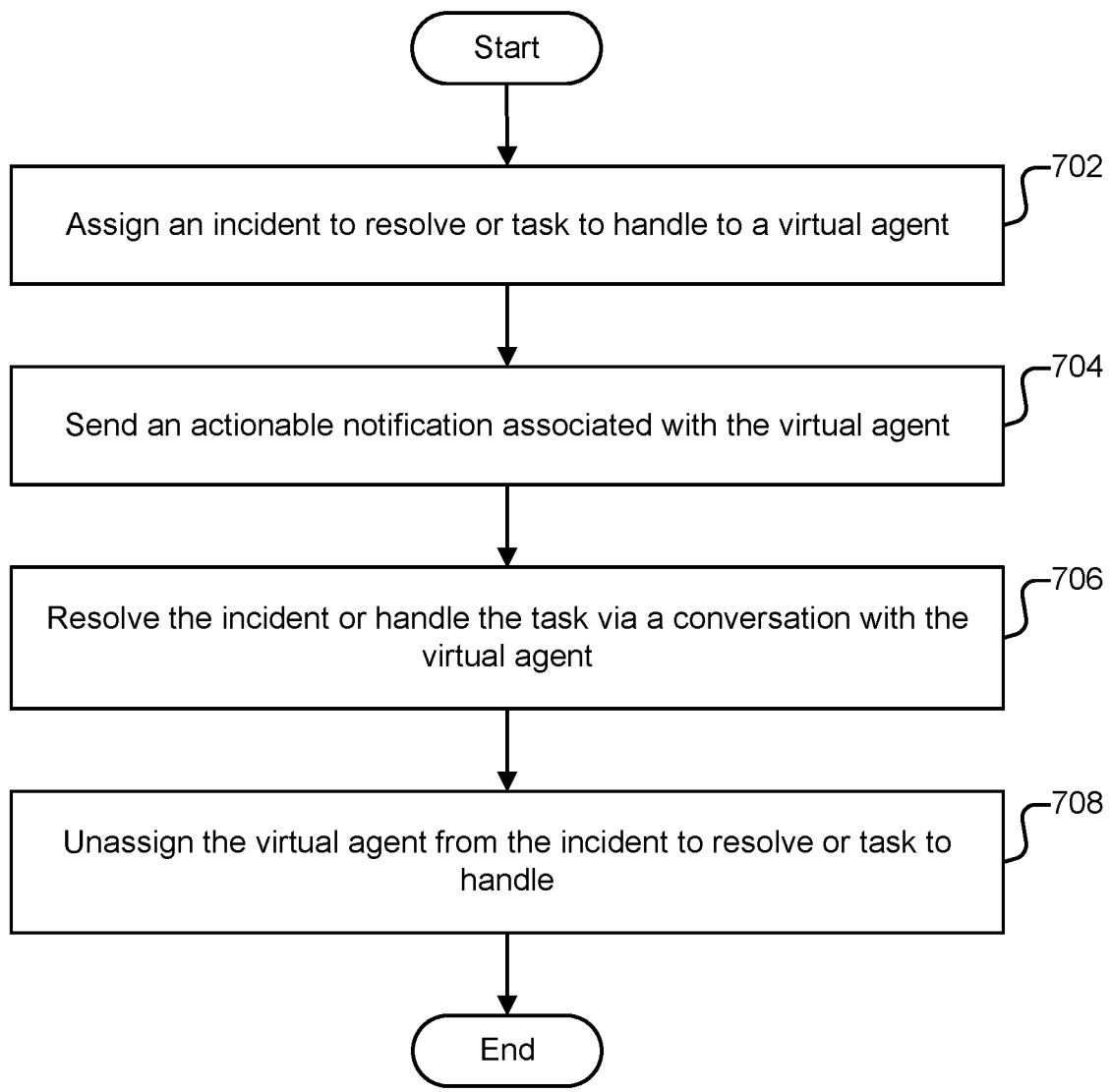
FIG. 7 is a flow chart illustrating an embodiment of a process for sending an actionable notification as part of resolving an incident or handling a task.

FIG. 7 is a flow chart illustrating an embodiment of a process for sending an actionable notification as part of resolving an incident or handling a task. In some embodiments, the process of FIG. 7 is performed by notification platform 200 of FIG. 2.

At 702, an incident to resolve or a task to handle is assigned to a virtual agent. Examples of incidents to resolve include information technology incidents (e.g., equipment failure, network connectivity problems, password issues, etc.). Example of tasks to handle include receiving approvals for human resources or other business requests, conducting surveys, marketing a consumer product, answering customer support questions, etc. In some embodiments, the virtual agent is hosted by virtual agent server 204 of FIG. 2. In some embodiments, the incident to resolve or task to handle is assigned to the virtual agent by notification server 202 of FIG. 2 or another server communicatively connected to virtual agent server 204 of FIG. 2. In some embodiments, the incident to resolve or task to handle is assigned based at least in part on specific rules or constraints. For example, specific rules may dictate that information technology equipment failure, network connectivity, network security, or other incidents or tasks should be initially assigned to a type of virtual agent instead of a live agent. In some embodiments, after it is determined that a virtual agent is required, a machine learning framework is utilized to determine a topic for the virtual agent. In some embodiments, determining the topic constrains what type of virtual agent is selected to resolve the incident or handle the task. For example, specific virtual agents may be utilized for different contexts, e.g., different ITSM or CSM contexts. In some embodiments, a machine learning framework maps a text associated with an incident to resolve or task to handle to a category/topic type. In various embodiments, the machine learning framework is trained on text datasets comprising a constrained set of texts associated with prescribed category/topic types to which texts belong. In some embodiments, intervention by a live agent is required (e.g., a topic cannot be assigned based on specific rules or a machine learning framework). For example, the live agent can determine a topic and manually select a virtual agent.

At 704, an actionable notification associated with the virtual agent is sent. In various embodiments, the actionable notification is sent to a user with a previous communication history that is known to the virtual agent. The virtual agent is able to select a communication channel, among a plurality of communication channel options, that is likely to be viewed by the user (e.g., a last used communication channel of the user). In some embodiments, the user is an employee or member of an organization that controls the virtual agent. The user can also be a third party (e.g., a consumer that the organization is contacting). In some embodiments, the actionable notification asks the user if the user would like to receive assistance regarding a specified matter. If the user accepts, the virtual agent initiates a conversation with the user. In various embodiments, the conversation between the virtual agent and the user continues until the incident to resolve or task to handle has been resolved/handled.

At 706, the incident to resolve or the task to handle is resolved/handled via a conversation with the virtual agent. For example, if the user has requested assistance with booking a hotel reservation, the task is complete after the virtual agent books a hotel that is satisfactory to the user and the user acknowledges that the booking is satisfactory. As another example, in an ITSM context, an incident is resolved when the user acknowledges that an information technology issue has been remedied.

At 708, the virtual agent is unassigned from the incident to resolve or the task to handle. In various embodiments, the virtual agent reports back to a software unit that assigned the incident to resolve or task to handle. For example, virtual agent server 204 of FIG. 2 may report back to notification server 202 of FIG. 2 to indicate that the assigned incident or task has been resolved/handled. The assigning software unit can then log the incident/task as resolved/handled. Thus, auto-resolution of incidents is provided for through an actionable notification mechanism.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising: receiving an indication of an actionable notification to be sent to a user;
storing the actionable notification included in a batch of notifications on a virtual agent server, wherein the virtual agent server supports a plurality of different types of virtual agents configured for a plurality of different communication tasks;
selecting based at least in part on a previous communication history with the user, a communication channel among a plurality of communication channel options for the user;
assigning the actionable notification to a selected virtual agent, from among the plurality of different types of virtual agents supported by the virtual agent server, based at least in part on analyzing content of the actionable notification and mapping the content of the actionable notification to a specialized topic of the selected virtual agent;
determining whether the user is actively engaged in conversation with another user; and
in response to a determination that the user is not actively engaged in conversation with another user, using the selected virtual agent to send the actionable notification to the user via the selected communication channel.

2. The method of claim 1, wherein the indication is triggered by a status change associated with the user.

3. The method of claim 1, wherein the indication is triggered at a specified time.

4. The method of claim 1, wherein the actionable notification includes a user interface component that the user is able to trigger to generate a display of information associated with the actionable notification.

5. The method of claim 1, further comprising receiving a response to the actionable notification from the user via the selected communication channel.

6. The method of claim 5, further comprising sending an additional information associated with the actionable notification to the user via the selected communication channel in response to receiving the response to the actionable notification from the user.

7. The method of claim 1, wherein the user is a member of an organization that causes the actionable notification to be sent to the user.

8. The method of claim 1, wherein the user is a third party to an organization that causes the actionable notification to be sent to the user.

9. The method of claim 1, wherein selecting the communication channel based at least in part on the previous communication history with the user includes determining a last used communication channel of the user.

10. The method of claim 1, wherein the plurality of communication channel options for the user includes one or more of the following: a chat service channel, a text messaging channel, or an electronic mail channel.

11. The method of claim 1, wherein determining whether the user is actively engaged in conversation with another user is based at least in part on determining whether the user has received or sent a message within a specified period of time.

12. The method of claim 1, wherein the plurality of communication channel options for the user includes at least one communication channel that was not originally supported for sending actionable notifications but specifically added for specified users.

13. The method of claim 1, wherein analyzing the content of the actionable notification includes utilizing a machine learning model to extract an intent associated with text of the actionable notification.

14. The method of claim 1, further comprising sending other notifications with the actionable notification as a group of notifications.

15. The method of claim 1, further comprising converting the actionable notification into a format associated with the selected communication channel.

16. A system, comprising:
one or more processors configured to:
receive an indication of an actionable notification to be sent to a user;
store the actionable notification included in a batch of notifications on a virtual agent server, wherein the virtual agent server supports a plurality of different types of virtual agents configured for a plurality of different communication tasks;
select based at least in part on a previous communication history with the user, a communication channel among a plurality of communication channel options for the user;
assign the actionable notification to a selected virtual agent, from among the plurality of different types of virtual agents supported by the virtual agent server, based at least in part on analyzing content of the actionable notification and mapping the content of the actionable notification to a specialized topic of the selected virtual agent;
determine whether the user is actively engaged in conversation with another user; and
in response to a determination that the user is not actively engaged in conversation with another user, use the selected virtual agent to send the actionable notification to the user via the selected communication channel; and
a memory coupled to at least one of the one or more processors and configured to provide at least one of the one or more processors with instructions.

17. A computer program product embodied in a non-transitory computer readable medium and comprising computer instructions for:
receiving an indication of an actionable notification to be sent to a user;
storing the actionable notification included in a batch of notifications on a virtual agent server, wherein the virtual agent server supports a plurality of different types of virtual agents configured for a plurality of different communication tasks;
selecting based at least in part on a previous communication history with the user, a communication channel among a plurality of communication channel options for the user;
assigning the actionable notification to a selected virtual agent, from among the plurality of different types of virtual agents supported by the virtual agent server, based at least in part on analyzing content of the actionable notification and mapping the content of the actionable notification to a specialized topic of the selected virtual agent;
determining whether the user is actively engaged in conversation with another user; and
in response to a determination that the user is not actively engaged in conversation with another user, using the selected virtual agent to send the actionable notification to the user via the selected communication channel.

18. The computer program product of claim 17, wherein the indication is triggered by a status change associated with the user.

19. The computer program product of claim 17, wherein the indication is triggered at a specified time.

20. The computer program product of claim 17, wherein the actionable notification includes a user interface component that the user is able to trigger to generate a display of information associated with the actionable notification.

* * * * *